Figure 1:
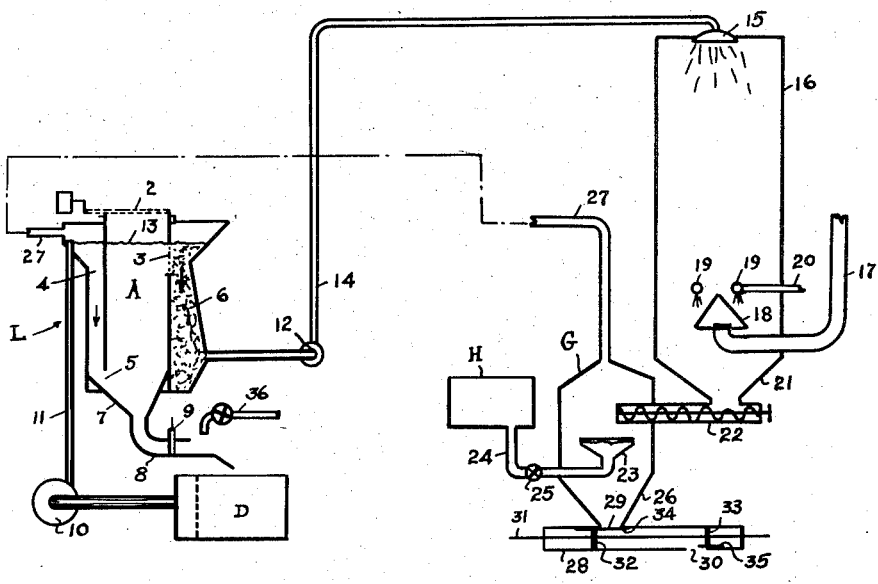

March 31, 1959  C. B. FRANCIS  2,880,062
PRODUCTION OF FERROUS SULFATE
Filed Jan. 16, 1957

INVENTOR.
Charles B. Francis
BY
Christy, Parmelee and Strickland
his attorneys

United States Patent Office 2,880,062
Patented Mar. 31, 1959

2,880,062

PRODUCTION OF FERROUS SULFATE

Charles B. Francis, Pittsburgh, Pa., assignor to Puriron and Chemicals, Inc., a corporation of Pennsylvania Application January 16, 1957, Serial No. 634,585

6 Claims. (Cl. 23—126)

This invention relates to the production of ferrous chloride and ferrous sulfate from siderite, limonite and hematite iron ores, from which a substantially carbon-free sponge iron and/or iron powder may be produced. Heretofore, sponge iron and iron powder have been made from certain grades of magnetite iron ores which can be purified by crushing, grinding and separating the magnetite ($Fe_3O_4$) magnetically from most of the impurities in the ore prior to reduction. The limonite and hematite ores are the chief iron ores of the United States and are composed of hydrous and anhydrous ferric oxide ($Fe_2O_3$) which is non-magnetic; and attempts to reduce these ores at temperatures under 2000° F. and separate the iron from the impurities have not been successful. These ores as prepared for blast furnace use vary widely in composition, as indicated by the chemcal analyses of dried samples after fusion with sodium carbonate:

|  | Ore No. 1 | Ore No. 2 | Ore No. 3 | Ore No. 4 |
|---|---|---|---|---|
|  | Percent | Percent | Percent | Percent |
| Iron, Fe | 49.80 | 46.80 | 47.00 | 53.30 |
| Silica, $SiO_2$ | 5.80 | 8.20 | 10.60 | 3.20 |
| Alumina, $Al_2O_3$ | 3.00 | 2.31 | 2.30 | 2.32 |
| Lime, CaO | 0.20 | 0.19 | 0.18 | 0.11 |
| Magnesia, MgO | 0.19 | 0.20 | 0.20 | 0.18 |
| Manganese, Mn | 0.77 | 1.12 | 0.63 | 0.43 |
| Phosphorus, P | 0.07 | 0.06 | 0.08 | 0.07 |

By treating these ores with hydrochloric acid containing sulfuric acid equivalent to the lime present, the iron and manganese are dissolved to form a substantially saturated primary solution. If the magnesia is present as the oxide or carbonate, it will also be dissolved. Since the chlorides of manganese and magnesium are present in the solution in small proportions, they may be separated from the ferrous chloride by removing in an evaporator about 80% of the water from the solution, and such evaporation of water will cause 80% of the ferrous chloride to precipitate. This salt may be separated from the residual mother liquor, as by means of a centrifuge, and such liquor is recirculated through the evaporator with new primary solution and the centrifuge operation is repeated to remove the ferrous chloride from the new solution. The operations are repeated or continued, until the chlorides of manganese and magnesium become concentrated in the residual liquor. Then the water in the liquor is evaporated in a separate drier, and the latter chlorides are recovered. In following such procedure a pure ferrous chloride is obtained, from which pure iron powder may be produced.

If the iron powder produced is to be used for such purposes as making common grades of steel, separation of the manganese and magnesium chlorides from the ferrous chloride is unnecessary.

The chief object of my present invention is to produce, using such ores as those indicated, ferrous chloride and ferrous sulfate, from which to produce relatively pure iron at a cost much lower than such iron has heretofore been produced. Other objects will be apparent in the following specification.

In accordance with my practice the ore is leached in hydrochloric acid, whereby the iron is separated from the gangue of the ore in the form of a concentrated solution of ferric chloride ($FeCl_3$), which is reacted with iron to produce ferrous chloride ($FeCl_2$). The excess water is evaporated from the resulting solution of ferrous chloride. The ferrous chloride may be directly reduced to iron powder with hydrogen, and this reaction is accompanied by a release of gaseous hydrochloric acid (HCl) which is recovered and used again in the leaching of the ore in a continuous or cyclic process. Such a direct reduction of the ferrous chloride, however, requires the use of relatively pure hydrogen that costs four or five cents per pound of iron produced. Furthermore, a large investment is required for sufficient hydrochloric acid gas to permit the production of a surplus of ferrous chloride for storage during shut downs of the iron-producing apparatus, or for use in producing iron powder during interruptions in the leaching operations. Also, the apparatus required is relatively costly, because the structure must be designed to prevent the escape of the hydrochloric acid gas, which is very injurious to the health. It was to overcome these drawbacks of the direct process that led to my present invention in an indirect process, as follows:

The ferrous chloride is treated with sulfuric acid to recover the chlorine in the form of hydrochloric acid gas which is used in a cyclic process for leaching the ore. In the latter case the iron is obtained as ferrous sulfate ($FeSO_4$), which may be reduced with hydrogen to iron powder and sulfur dioxide, the latter being recovered as ammonium sulfite, in accordance with the method described in my copending application, Serial No. 446,278, filed July 28, 1954, now Patent No. 2,818,328.

Figure 2:
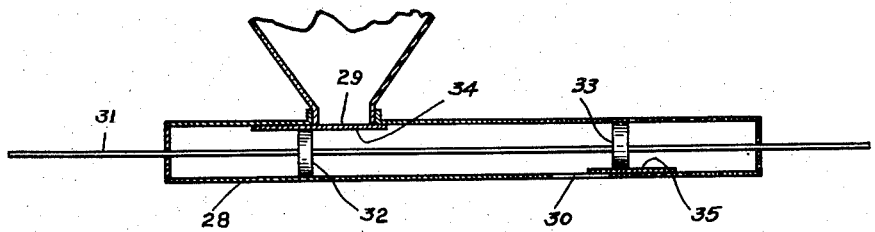

The invention will be understood upon reference to the accompanying drawings in which:

Fig. 1 is a diagrammatic view, in vertical section showing a leaching apparatus and spray drier included with the equipment for carrying out the processes of my present invention; and Fig. 2 is a diagrammatic view in vertical section of a portion of the apparatus shown in Fig. 1.

Referring to Fig. 1 of the drawings, the leaching apparatus L comprises a tank A having a vibrating impact screen 2 mounted for operation at the otherwise open top of the tank. A filter 3 is provided near the top of the tank's side wall. A vertical compartment 4 communicates at its bottom, as at 5, with the bottom of tank A, and a vertical compartment 6 communicates at its top, through the filter 3, with the top of the said tank. The bottom of the tank is formed as a hopper 7 having a duct 8, controlled by a valve 9, for discharge of the residuum of the tank into a wash tank D. A pump 10, formed of copper-silicon, or nickel-copper alloy, is provided for feeding water or residual liquor via pipe 11, as will presently appear, from the wash tank D to the top of the compartment 4. The pipe 11 may be either formed of rubber, or of the same material as the pump 10. The apparatus L may be formed of steel plates welded together and coated internally with an acid-resisting material, such as rubber. By forming the tank 3 ft. wide by 4 ft. long by 9 ft. high, the apparatus is capable of treating sixty tons of iron ore per 24-hour day.

Proceeding in accordance with the invention, several tons of iron ore (hematite will in exemplary way be used as the ore) are finely crushed to pass a screen ⅛ in. to ¼ in. mesh, and, with valve 9 closed, the tank is filled up to the bottom of the filter 3 with a body of concentrated hydrochloric acid (22° or 35% by weight). The relatively deep body of acid is heated to 140° F. by injecting steam into it, or by any other suitable method. The compartment 6 is filled with small pieces of iron or steel scrap, such as turnings. Crushed ore is then delivered continuously upon the impact screen 2 at a rate of about 80 to 85 lbs. per minute. The particles of ore are fed through the interstices of the screen into the column of acid in the tank below. The acid reacts exothermically with the ore, as follows:

(Reaction I)

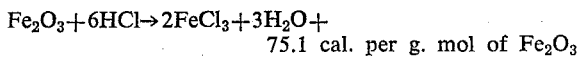
$$Fe_2O_3 + 6HCl \rightarrow 2FeCl_3 + 3H_2O +$$
75.1 cal. per g. mol of $Fe_2O_3$ The acid also reacts with part of the manganese, calcium and magnesium oxides in the ore, but leaves the silica and alumina and the small quantities of other impurities as an insoluble residue.

When ore equal to the weight of the acid in tank A has been added, acid is added through the top of compartment 4 at a rate, based on weight, equal to four times the rate of the feeding of the hematite, or five or six times the rate of feeding the ore.. The acid flows downwardly through the compartment 4 and maintains a high concentration of acid at the bottom of tank A, while the fine ore admitted through the screen 2 at the top of such tank maintains the solution produced, a solution comprised essentially of ferric chloride, nearly at neutral value as it overflows through the filter 3 into the compartment 6 that contains the body of ferrous metallic scrap. Considering the action more specifically, it will be understood that as the ore in comminuted form is delivered into and gradually descends in the deep aqueous solution of hydrochloric acid in tank A the $Fe_2O_3$ is progressively converted into dissolved ferric chloride. As the ferric chloride solution is formed it is borne upon the hydrochloric acid solution below it, with the effect that the continuing addition of the iron ore into the tank A from above, plus the addition of acid from below, causes the ferric chloride solution to rise and overflow into the compartment 6, as described. In compartment 6 any free acid in the solution is quickly neutralized while it flows downwardly through the porous mass of scrap, and the ferric chloride ($FeCl_3$) is reduced to ferrous chloride ($FeCl_2$) in accordance with the following exothermic reaction:

(Reaction II)

$$2FeCl_3 + Fe \rightarrow 3FeCl_2 + 53 \text{ cal. per g. mol of } FeCl_3$$

When Reactions I and II are added algebraically, the sum gives:

(Reaction III)

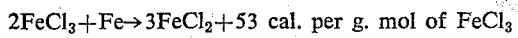
$$Fe_2O_3 + 6HCl + Fe \rightarrow 3FeCl_2 +$$
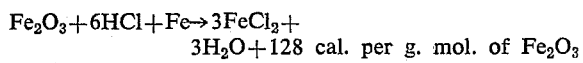
$$3H_2O + 128 \text{ cal. per g. mol. of } Fe_2O_3$$

When the solution in tank A reaches the level 13, a pump 12 is started and subcants the solution from near the bottom of compartment 6 and delivers it through pipe 14 to a spray nozzle 15 at the top of an evaporator or drier 16, which is heated by hot gases delivered through a duct 17. The hot gases may comprise products of combustion delivered upwardly beneath a conical hood 18, whence they spread upwardly through the unit 16. Burners 19, to which fluid fuel is fed by a pipe 20, supply such additional heat to the hot gases as may be required.

The evaporation of the water from the solution sprayed into the evaporator 16 leaves dry ferrous chloride crystals, with small quantities of the chlorides of manganese and magnesium. The ferrous chloride salt retains from the time of its formation one molecule of water of crystallization at 450° F., represented by the formula $FeCl_2 \cdot H_2O$. The crystalline chlorides collect in a hopper 21 provided at the bottom of the evaporator, whence they are fed by a screw conveyor 22 into a reaction chamber G.

In the chamber G a pan 23 is provided, the pan containing a pool of concentrated (66°) sulfuric acid. Into such pool the screw conveyor 22 progressively discharges the crystals. Sulfuric acid is delivered from a supply tank H through a pipe 24 that includes a valve 25. The valve 25 is adjusted so that acid overflows the rim of the pan 23, whereby the particles of salt falling into the pool are buoyed upwardly in the pool and swept over the edge of the pan, whence the salt and overflowing acid fall upon the steeply sloped side walls of a hopper 26. In consequence the salt and acid are thoroughly mixed and react endothermically, to form ferrous sulfate (and inconsequential amounts of manganese sulfate and magnesium sulfate) and hydrochloric acid gas is released in accordance with the following reaction, it being noted that the ferrous chloride coming from the hot evaporator adds sufficient heat to the acid in pan 23 to make-up for the heat lost in the reaction. Additionally, heat for the reaction may be applied to the bottom of the chamber G, or to the housing of the conveyor below such chamber.

(Reaction IV)

$$H_2SO_4 + FeCl_2 \cdot H_2O \rightarrow FeSO_4 \cdot H_2O +$$
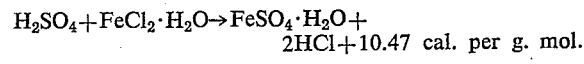
$$2HCl + 10.47 \text{ cal. per g. mol.}$$

The hydrochloric acid gas released in the reaction escapes through pipe 27 which conducts it into the top of the enclosed compartment 4 of the leaching tank A. Thereafter, water equal to 4.3 times the weight of the ore treated is pumped from tank D through pipe 11 to the top of the compartment 4, to maintain in conjunction with the hydrochloric acid gas the concentration of the acid flowing into the bottom of leaching tank A at approximately 30% by weight. It will be understood that this process is cyclic; the acid first used is recovered and re-used repeatedly in the continuous separation of the iron from the gangue of the ore.

As indicated by Reaction IV, the salt that is formed in the bottom of reaction chamber G is the monohydrate of ferrous sulfate, which is a dry, finely divided white powder that remains unaffected by the air, which gives off the one molecule of water at 900° F., which shows no signs of melting at temperatures below 1550° F. and which may be reduced by hydrogen at temperatures between 1100 and 1400° F. to form $SO_2$ and an iron powder that is not pyrophoric, the non-pyrophoric quality of the iron powder produced being an important and valuable characteristic of my method.

In order to remove the iron salt from the bottom of chamber G, while maintaining a seal to prevent the escape of the hydrochloric acid gas formed, I have originated a particularly effective device. The device comprises an elongate box 28 of square cross section, constructed of heavy terne plate or of 3/16 in. steel plate. This box has two openings 29 and 30, as shown, the opening 29 on the top being flanged, so that it may be easily bolted to the bottom opening of the reaction chamber G. Inside, the box is provided with a push-rod 31, which is supported by tight bearings in the opposite end walls of the box. Attached to this rod 31 are two plungers 32 and 33 that are so spaced longitudinally of the rod that, when plunger 32 is positioned at the left-hand edge of the top openings 29, the plunger 33 will be at the right edge of the bottom opening 30. Attached to the top of plunger 32 is a valve plate 34 which is twice as long as the opening 29, while a similar plate 35, three-fourths as long as valve plate 34, is attached to the bottom of plunger 33. From the drawing it will be apparent that, when the push-rod 31 is drawn to the left, opening 30 will be closed by plate 35 as plate 34 uncovers opening 29, from below, permitting salt to descend from hopper 26 into the box 28. As the push-rod 31 is moved to the right, opening 29 is first closed by plate 34, while plate 35 uncovers opening 30. Then, as plunger 32 moves to the opposite edge of opening 29, the salt in the box is pushed forward to fall through opening 30 into a suitable receptacle. The weight of salt transferred per minute is controlled by the number of strokes of the push-rod per minute.

The crystalline ferrous sulphate thus produced is heated to a temperature of 900° F., say in rotary kiln apparatus of the sort shown in my above-noted copending patent application, and the water of crystallization is driven off and the salt is preheated. Thereupon, the dehydrated salt is heated to a temperature of from 1200° F. to 1500° F. in an atmosphere of hydrogen, with effect that the salt is reduced to powdered iron, with a release of sulfur dioxide ($SO_2$), which is recovered as ammonium sulfite, as described in my said copending application.

The exact temperature at which the salt is reduced in the hydrogen atmosphere is important, because the iron powder formed at a temperature between 1220° F. and 1300° F. is extremely finely divided (minus 300 mesh), while the powder formed at a higher temperature is coarser, the coarseness increasing with the temperature until at 1500° F. sponge iron begins to form.

In lieu of hydrogen the reducing agents may be a mixture of hydrogen and carbon monoxide.

In the event pure ferrous chloride is desired for conversion into pure ferrous sulfate, or for other use, the procedure described in the second paragraph of this specification may be followed. That is to say, only about 80% of the water is removed from the solution fed into the evaporator 16, whereby pure ferrous chloride crystals are precipitated in the residual liquor. The liquor and crystals may be introduced to a conventional centrifuge and the recovered ferrous chloride crystals may be introduced to the conveyor 22 for further processing in the manner already described, to produce pure ferrous sulfate. The residual liquor is passed from the centrifuge and mixed with the solution fed through line 14 into the evaporator 16. Eventually, the residual liquor removed from the centrifuge will become saturated with the chlorides of manganese and magnesium, and when this occurs the liquor will be passed from the centrifuge to a separate drier and the manganese and magnesium salts recovered in solid form. Then the operation is continued in normal way.

From time to time the hopper 7 at the bottom of the leaching tank A becomes filled with residue—the insoluble gangue of the ore—and from time to time the valve 9 is opened to let the accumulated residue escape into the wash tank D. The valve 9 is closed before the hopper 7 is entirely emptied, so that acid or solution will not escape from the bottom of tank A. The residue discharged by the duct 8 is flushed and washed with water from a pipe 36. The residue is carefully inspected for incompletely dissolved ore particles. The presence of such ore particles, if large, indicates that a hole has been worn in the impact screen 2. If the particles of ore in the residue are small the indication is that the ore should be ground to a finer size. The tailings from the screen will also give the same indication.

Having thus described an exemplary practice of my invention, it is to be understood that many modifications and variations may be made without exceeding the scope of the invention defined in the following claims.

The application for these Letters Patent comprised a continuation-in-part of my application, Serial No. 446,277, filed July 28, 1954, and now abandoned.

I claim:

1. An improved method of producing ferrous sulfate which comprises gradually feeding iron ore in comminuted form into a relatively deep body of liquid comprised of an aqueous solution of hydrochloric acid and during the descent of the ore in the solution reducing the ore to dissolved ferric chloride, feeding additional hydrochloric acid into the lower portion of the body of liquid and, by such feeding of additional hydrochloric acid plus said feeding of ore, effecting the rise of said ferric chloride solution and the flow thereof from the upper portion of said body of liquid into contact with a mass of metallic iron and thereby converting the ferric chloride solution to a ferrous chloride solution, and removing the excess liquid from the latter solution to provide crystalline ferrous chloride, gradually delivering the ferrous chloride crystals to a pool of sulfuric acid and thereby producing ferrous sulfate, with an accompanying release and rise of hydrochloric acid gas from the pool of sulfuric acid, and feeding the said gas with added water into said acid solution to provide the said additional hydrochloric acid therefor.

2. An improved method of producing ferrous sulfate which comprises gradually feeding iron ore in comminuted form into a relatively deep body of liquid comprised of an aqueous solution of hydrochloric acid and during the descent of the ore in the solution reducing the ore to dissolved ferric chloride, feeding additional hydrochloric acid into the lower portion of the body of liquid and, by such feeding of additional hydrochloric acid plus said feeding of ore, effecting the rise of said ferric chloride solution and the flow thereof from the upper portion of said body of liquid into contact with a mass of metallic iron and thereby converting the ferric chloride solution to a ferrous chloride solution, removing the excess liquid from the latter solution by evaporation under the influence of heat to provide heated crystalline ferrous chloride, gradually delivering the heated ferrous chloride crystals to a pool of sulfuric acid and thereby producing ferrous sulfate, with an accompanying release and rise of hydrochloric acid gas from the pool of sulfuric acid, while the heated ferrous chloride furnishes heat for the endothermic reaction of the sulfuric acid with the ferrous chloride, and feeding the said gas with added water into said acid solution to provide the said additional hydrochloric acid therefor.

3. The method of converting ferrous chloride to ferrous sulfate which comprises gradually delivering ferrous chloride crystals upon the surface of a pool of sulfuric acid to which heat is added and thereby converting the ferrous chloride to ferrous sulfate, with the release of hydrochloric acid gas, while overflowing the ferrous sulfate from the surface of the pool for collection.

4. The method of producing solid ferrous sulfate from a ferrous chloride solution which comprises evaporating liquid under the effect of heat from the ferrous chloride solution to produce heated ferrous chloride crystals, gradually delivering the heated crystals upon the surface of a pool of sulfuric acid and thereby in an endothermic reaction producing ferrous sulfate, with a release of hydrochloric acid gas, and overflowing the ferrous sulfate from the surface of the pool for collection.

5. The method of converting ferrous chloride to ferrous sulfate which comprises gradually delivering ferrous chloride crystals upon the surface of a pool of sulfuric acid to which heat is added and thereby converting the ferrous chloride to ferrous sulfate, with the release of hydrochloric acid gas, continuously flowing sulfuric acid into said pool while overflowing the ferrous sulfate from the surface of the pool for collection.

6. The method of producing solid ferrous sulfate from a ferrous chloride solution which comprises evaporating liquid under the effect of heat from the ferrous chloride solution to produce heated ferrous chloride crystals, gradually delivering the heated crystals upon the surface of a pool of sulfuric acid and thereby in an endothermic reaction producing ferrous sulfate, with the release of hydrochloric acid gas, continuously flowing sulfuric acid into said pool and overflowing the ferrous sulfate from the surface of the pool for collection.

References Cited in the file of this patent

UNITED STATES PATENTS

| 875,425 | Gillies | Dec. 31, 1907 |
| 1,938,461 | Prutton | Dec. 5, 1933 |
| 2,183,837 | Hamilton et al. | Dec. 19, 1939 |
| 2,592,580 | Loevenstein | Apr. 15, 1952 |

FOREIGN PATENTS

| 1,788 | Great Britain | 1880 |
| 3,757 | Great Britain | 1889 |
| 100,517 | Great Britain | June 1, 1916 |